United States Patent
Li et al.

(10) Patent No.: US 8,736,707 B2
(45) Date of Patent: May 27, 2014

(54) SYSTEM AND METHOD FOR UTILIZING SCENE DETECTION IN A DEPTH ESTIMATION PROCEDURE

(75) Inventors: Pingshan Li, Sunnyvale, CA (US); Kensuke Miyagi, Sunnyvale, CA (US); Florian Ciurea, San Jose, CA (US); Tomonori Shuda, Tokyo (JP)

(73) Assignee: Sony Corporation, Tokyo (JP)

( * ) Notice: Subject to any disclaimer, the term of this patent is extended or adjusted under 35 U.S.C. 154(b) by 33 days.

(21) Appl. No.: 13/429,328

(22) Filed: Mar. 24, 2012

(65) Prior Publication Data

US 2013/0141615 A1 Jun. 6, 2013

Related U.S. Application Data

(60) Provisional application No. 61/565,790, filed on Dec. 1, 2011.

(51) Int. Cl.
*H04N 5/228* (2006.01)
(52) U.S. Cl.
USPC .................................................. 348/222.1
(58) Field of Classification Search
USPC ....................... 348/222.1, 241, 349
See application file for complete search history.

(56) References Cited

U.S. PATENT DOCUMENTS

| | | | |
|---|---|---|---|
| 2006/0061569 A1* | 3/2006 | Yamada | 345/422 |
| 2008/0075383 A1 | 3/2008 | Wu et al. | |
| 2009/0268985 A1* | 10/2009 | Wong et al. | 382/299 |
| 2010/0033618 A1* | 2/2010 | Wong et al. | 348/347 |
| 2010/0194971 A1* | 8/2010 | Li et al. | 348/349 |

OTHER PUBLICATIONS

Andrew B. Watson and Albert J. Ahumada, Blur Clarified: A Review and Synthesis of Blur Discrimination, Sep. 19, 2011, http://www.journalofvision.org/content/11/5/10.full.pdf+html, NASA Ames Research Center, Moffett Field, CA, USA, 1-23 pages.
Oliver Whyte, Josef Sivic, Andrew Zisserman, Jean Ponce, Non-Uniform Deblurring for Shaken Images, Jun. 13-18, 2010, http://www.di.ens.fr/sierra/pdfs/cvpr10d.pdf, Dept. of Engineering Science, University of Oxford, 1-8 pages.

* cited by examiner

*Primary Examiner* — Gevell Selby
(74) *Attorney, Agent, or Firm* — Gregory J. Koerner; Redwood Patent Law (57) ABSTRACT

A system and method for performing a depth estimation procedure includes a camera device with a sensor device for capturing blur images of a photographic target. Each of the captured blur images has a corresponding scene type that includes either a Gaussian scene type or a pillbox scene type. A depth generator performs a scene recognition procedure to identify the appropriate scene type for the respective blur images. The depth generator then selects an effective depth estimation procedure depending upon the detected scene type.

17 Claims, 14 Drawing Sheets

SYSTEM AND METHOD FOR UTILIZING SCENE DETECTION IN A DEPTH ESTIMATION PROCEDURE

CROSS-REFERENCE TO RELATED APPLICATIONS

This application is related to, and claims priority in, U.S. Provisional Patent Application No. 61/565,790, entitled "Depth Estimation From Two Defocused Images Under Various Lighting Conditions," filed on Dec. 1, 2011. The foregoing related application is commonly assigned, and is hereby incorporated by reference.

BACKGROUND SECTION

1. Field of the Invention

This invention relates generally to techniques for analyzing image data, and relates more particularly to a system and method for utilizing scene detection in a depth estimation procedure.

2. Description of the Background Art

Implementing efficient methods for analyzing image data is a significant consideration for designers and manufacturers of contemporary electronic devices. However, efficiently analyzing image data with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively analyzes digital image data may benefit from an effective implementation because of the large amount and complexity of the digital data involved.

Due to growing demands on system resources and substantially increasing data magnitudes, it is apparent that developing new techniques for analyzing image data is a matter of concern for related electronic technologies. Therefore, for all the foregoing reasons, developing effective systems for analyzing image data remains a significant consideration for designers, manufacturers, and users of contemporary electronic devices.

SUMMARY

In accordance with the present invention, a system and method for utilizing scene detection in a depth estimation procedure is disclosed. In one embodiment, a camera initially captures a clipped blur image1. The focus setting of the camera is then changed. For example, the focus setting may be adjusted to decrease the focus of the camera by one depth-of-field. The camera then captures a defocused blur image2 that is more blurry (out of focus) than previously captured image1.

A depth estimator or other appropriate entity begins a scene detection procedure by defining a detection threshold for identifying either a Gaussian scene or a pillbox scene corresponding to the captured blur image1 and blur image2. In accordance with the present invention, the depth estimator then computes an edge-region average luminance difference between image1 and image2.

The depth estimator next compares the calculated edge-region difference to the pre-defined detection threshold. If the detection threshold is exceeded, then the depth estimator identifies the captured image1 and image2 as part of a pillbox scene. Conversely, if the detection threshold is not exceeded, then the depth estimator identifies the captured image1 and image2 as part of a Gaussian scene.

Finally, in step 1150, depth estimator 416 may select and perform an appropriate depth estimation procedure depending upon whether a Gaussian scene or a pillbox scene was detected. The FIG. 11 process may then terminate. The present invention therefore provides an improved system and method for utilizing scene detection for performing a depth estimation procedure.

DETAILED DESCRIPTION

The present invention relates to an improvement in image data analysis techniques. The following description is presented to enable one of ordinary skill in the art to make and use the invention and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for performing a depth estimation procedure, and includes a camera device with a sensor device for capturing blur images of a photographic target. Each of the captured blur images has a corresponding scene type that includes either a Gaussian scene type or a pillbox scene type. A depth generator advantageously performs a scene recognition procedure to accurately identify the appropriate scene type for the respective blur images. The depth generator then selects an effective depth estimation procedure depending upon the detected scene type.

Figure 1:
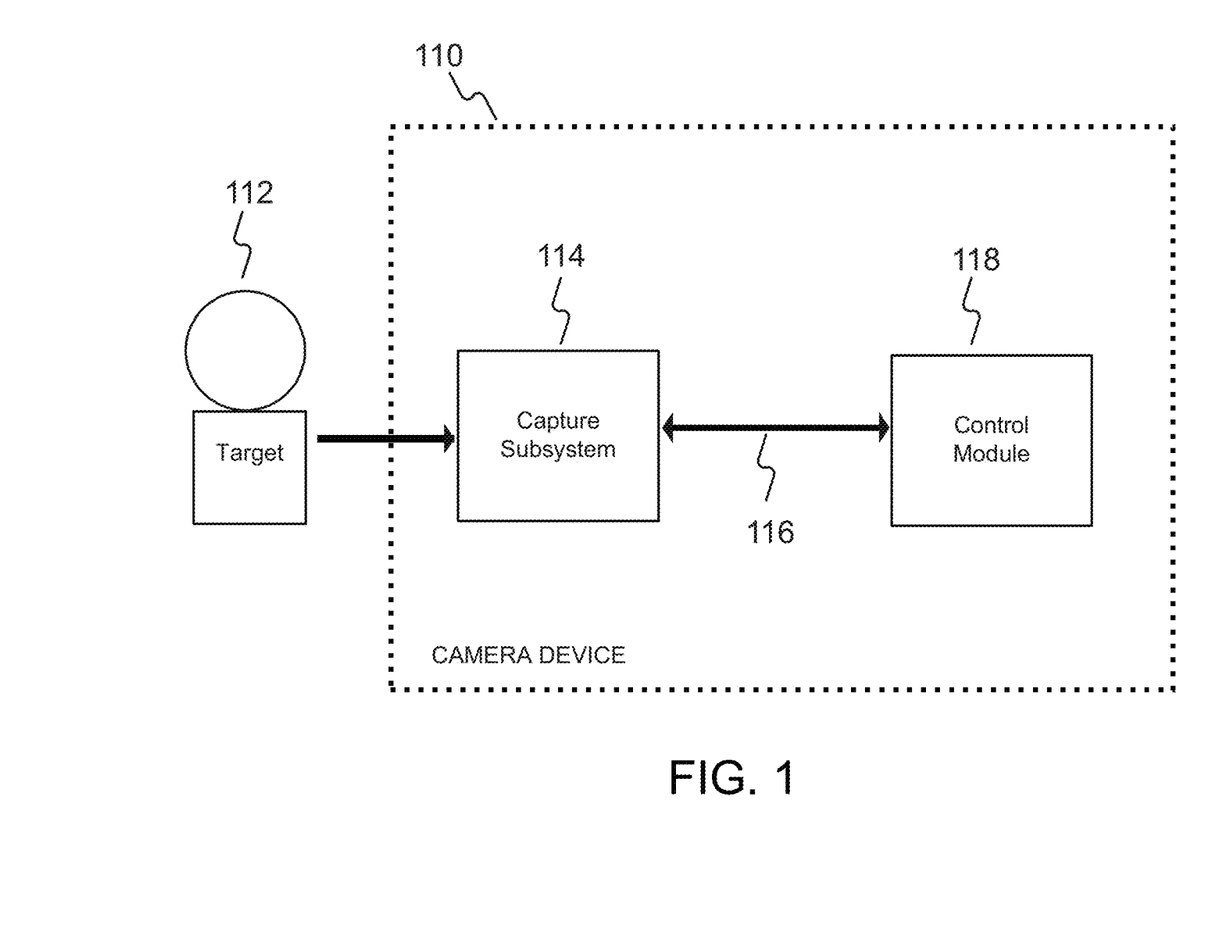
FIG. 1 is a block diagram for one embodiment of a camera device, in accordance with the present invention.

Referring now to FIG. 1, a block diagram for one embodiment of a camera device 110 is shown, in accordance with the present invention. In the FIG. 1 embodiment, camera device 110 may include, but is not limited to, a capture subsystem 114, a system bus 116, and a control module 118. In the FIG. 1 embodiment, capture subsystem 114 may be optically coupled to a photographic target 112, and may also be electrically coupled via system bus 116 to control module 118.

In alternate embodiments, camera device 110 may readily include various other components in addition to, or instead of, those components discussed in conjunction with the FIG. 1 embodiment. In addition, in certain embodiments, the present invention may alternately be embodied in any appropriate type of electronic device other than the camera device 110 of FIG. 1. For example, camera device 110 may alternately be implemented as an imaging device, a computer device, or a consumer electronics device.

In the FIG. 1 embodiment, once capture subsystem 114 of camera 110 is automatically focused on target 112, a camera user may request camera device 110 to capture image data corresponding to target 112. Control module 118 then may preferably instruct capture subsystem 114 via system bus 116 to capture image data representing target 112. The captured image data may then be transferred over system bus 116 to control module 118, which may responsively perform various processes and functions with the image data. System bus 116 may also bi-directionally pass various status and control signals between capture subsystem 114 and control module 118.

Figure 2:
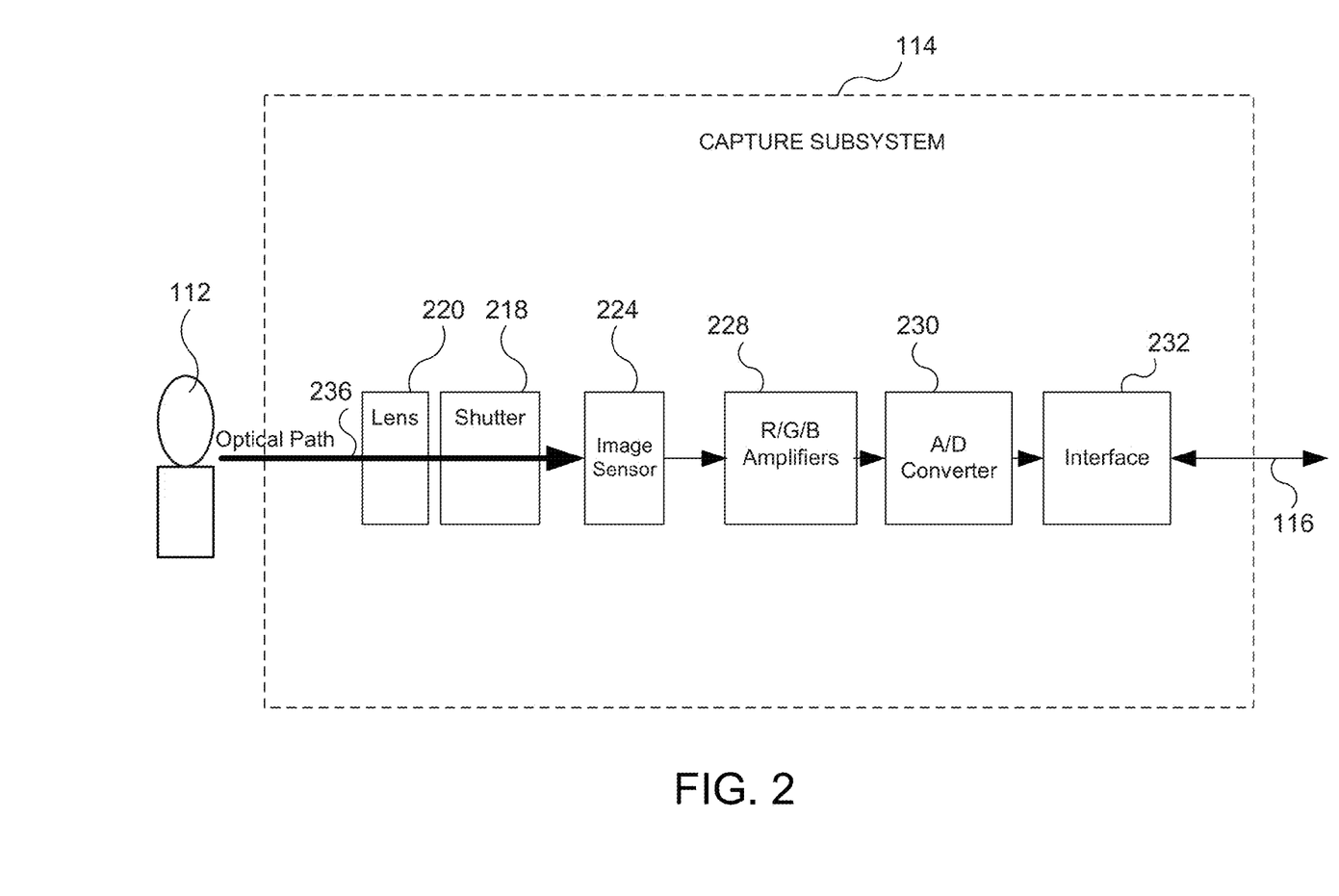
FIG. 2 is a block diagram for one embodiment of the capture subsystem of FIG. 1, in accordance with the present invention.

Referring now to FIG. 2, a block diagram for one embodiment of the FIG. 1 capture subsystem 114 is shown, in accordance with the present invention. In the FIG. 2 embodiment, capture subsystem 114 preferably comprises, but is not limited to, a shutter 218, a lens 220, an image sensor 224, red, green, and blue (R/G/B) amplifiers 228, an analog-to-digital (A/D) converter 230, and an interface 232. In alternate embodiments, capture subsystem 114 may readily include various other components in addition to, or instead of, those components discussed in conjunction with the FIG. 2 embodiment.

In the FIG. 2 embodiment, capture subsystem 114 may capture image data corresponding to target 112 via reflected light impacting image sensor 224 along optical path 236. Image sensor 224, which may preferably include a charged-coupled device (CCD), may responsively generate a set of image data representing the target 112. The image data may then be routed through amplifiers 228, A/D converter 230, and interface 232. From interface 232, the image data passes over system bus 116 to control module 118 for appropriate processing and storage. Other types of image capture sensors, such as CMOS or linear arrays are also contemplated for capturing image data in conjunction with the present invention. The utilization and functionality of camera 110 is further discussed below in conjunction with FIGS. 3-12.

Figure 3:
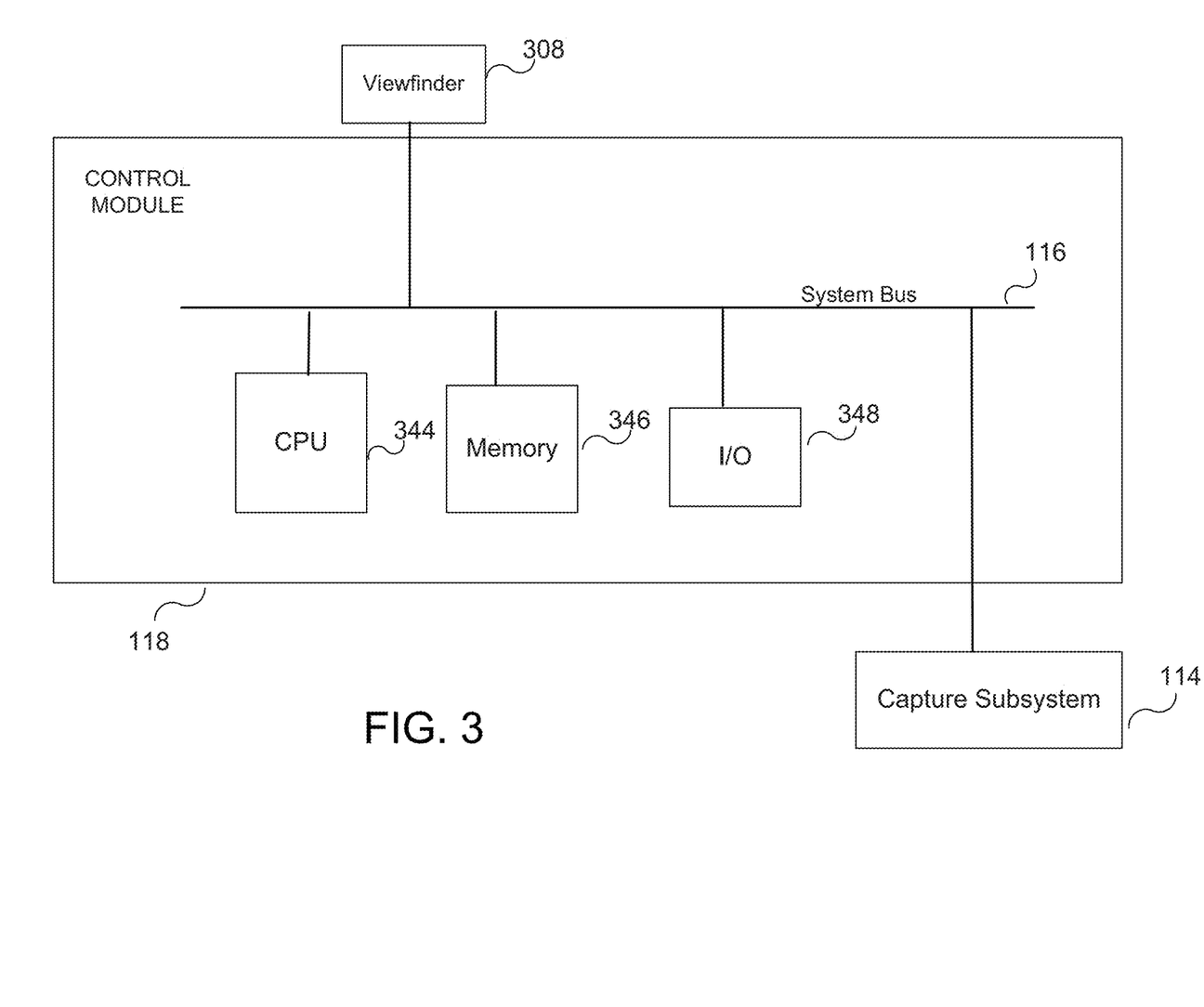
FIG. 3 is a block diagram for one embodiment of the control module of FIG. 1, in accordance with the present invention.

Referring now to FIG. 3, a block diagram for one embodiment of the FIG. 1 control module 118 is shown, in accordance with the present invention. In the FIG. 3 embodiment, control module 118 preferably includes, but is not limited to, a viewfinder 308, a central processing unit (CPU) 344, a memory 346, and one or more input/output interface(s) (I/O) 348. Viewfinder 308, CPU 344, memory 346, and I/O 348 preferably are each coupled to, and communicate, via common system bus 116 that also communicates with capture subsystem 114. In alternate embodiments, control module 118 may readily include various other components in addition to, or instead of, those components discussed in conjunction with the FIG. 3 embodiment.

In the FIG. 3 embodiment, CPU 344 may be implemented to include any appropriate microprocessor device. Alternately, CPU 344 may be implemented using any other appropriate technology. For example, CPU 344 may be implemented to include certain application-specific integrated circuits (ASICs) or other appropriate electronic devices. Memory 346 may be implemented as one or more appropriate storage devices, including, but not limited to, read-only memory, random-access memory, and various types of non-volatile memory, such as floppy disc devices, hard disc devices, or flash memory. I/O 348 may provide one or more effective interfaces for facilitating bi-directional communications between camera device 110 and any external entity, including a system user or another electronic device. I/O 348 may be implemented using any appropriate input and/or output devices. The operation and utilization of control module 118 are further discussed below in conjunction with FIG. 4 through 12.

Figure 4:
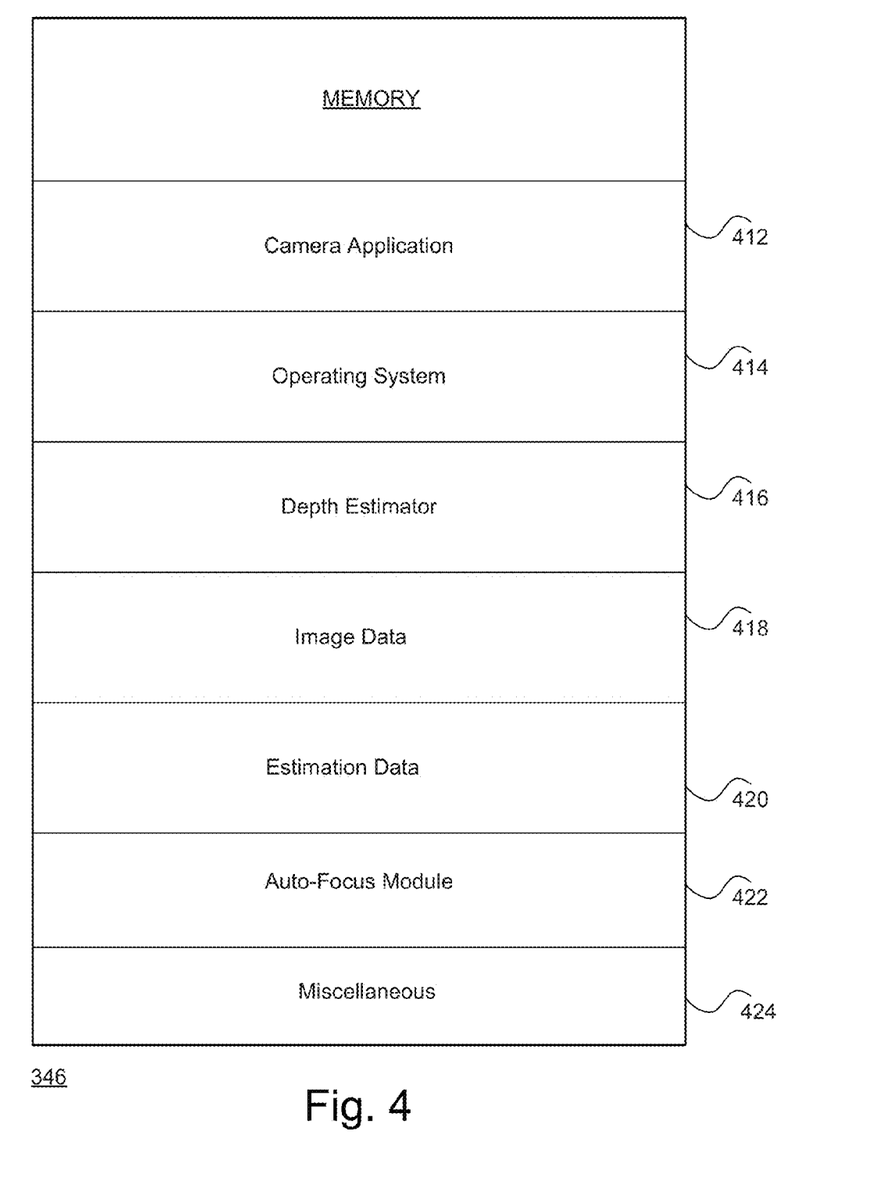
FIG. 4 is a block diagram for one embodiment of the memory of FIG. 3, in accordance with the present invention.

Referring now to FIG. 4, a block diagram for one embodiment of the FIG. 3 memory 346 is shown, in accordance with the present invention. In the FIG. 4 embodiment, memory 346 may include, but is not limited to, a camera application 412, an operating system 414, a depth estimator 416, image data 418, estimation data 420, an auto-focus module 422, and miscellaneous information 424. In alternate embodiments, memory 346 may include various other components in addition to, or instead of, those components discussed in conjunction with the FIG. 4 embodiment.

In the FIG. 4 embodiment, camera application 412 may include program instructions that are preferably executed by CPU 344 (FIG. 3) to perform various functions and operations for camera device 110. The particular nature and functionality of camera application 412 preferably varies depending upon factors such as the type and particular use of the corresponding camera device 110.

In the FIG. 4 embodiment, operating system 414 preferably controls and coordinates low-level functionality of camera device 110. In accordance with the present invention, depth estimator 416 may control and coordinate a depth estimation procedure to facilitate automatic focus features in camera 110. In the FIG. 4 embodiment, image data 418 may include one or more images of a photographic target 112 captured by camera device 110. Estimation data 420 may include any types of information or data for performing a depth estimation procedure. In the FIG. 4 embodiment, auto-focus module 422 may utilize the results of the depth estimation procedure to perform an auto-focus procedure for camera device 110. Miscellaneous information 424 includes any other appropriate information for the operation of camera 110. Additional details regarding the operation of depth estimator 416 are further discussed below in conjunction with FIGS. 5-12.

Figure 5:
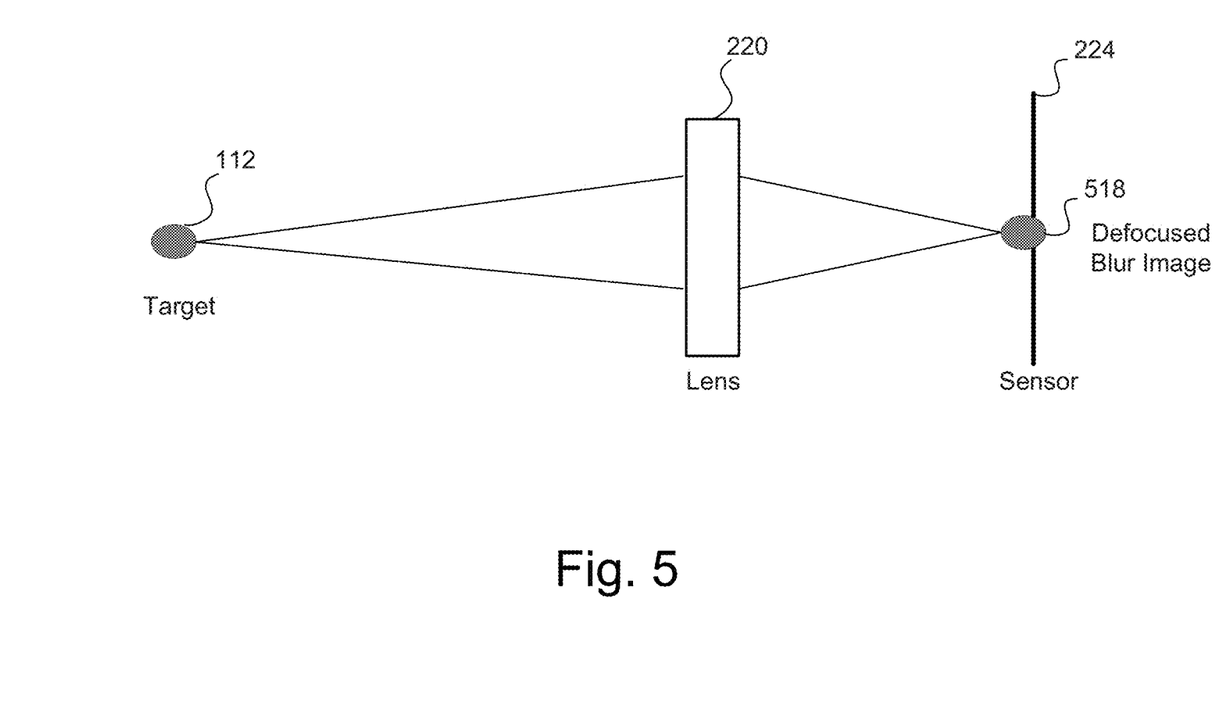
FIG. 5 is a diagram of one exemplary embodiment for capturing a defocused blur image, in accordance with the present invention.

Referring now to FIG. 5, a diagram of one exemplary embodiment for capturing a defocused blur image 518 is shown, in accordance with the present invention. The FIG. 5 embodiment is provided for purposes of illustration, and in alternate embodiments, the present invention may utilize various other configurations and elements to capture defocused blur images 518.

In the FIG. 5 embodiment, a sensor 224 of a camera 110 (see FIG. 2) may capture a defocused blur image 518 of a photographic target or scene 112 for performing a depth estimation procedure. The defocused blur image 518 may be created by adjusting lens 220 to a position other than the correct in-focus lens position that depends upon the relative positions of target 112, lens 220, and sensor 224.

In one embodiment, two different defocused blur images 518 may be compared to derive a depth estimation. A blur difference may be calculated for two blur images 518 that are one depth-of-field away from each other. A slope of a known matching curve and the blur difference can be utilized to determine the depth of a given target 112. The generation and utilization of defocused blur images for depth estimation are further discussed below in conjunction with FIGS. 6-12.

Figure 6:
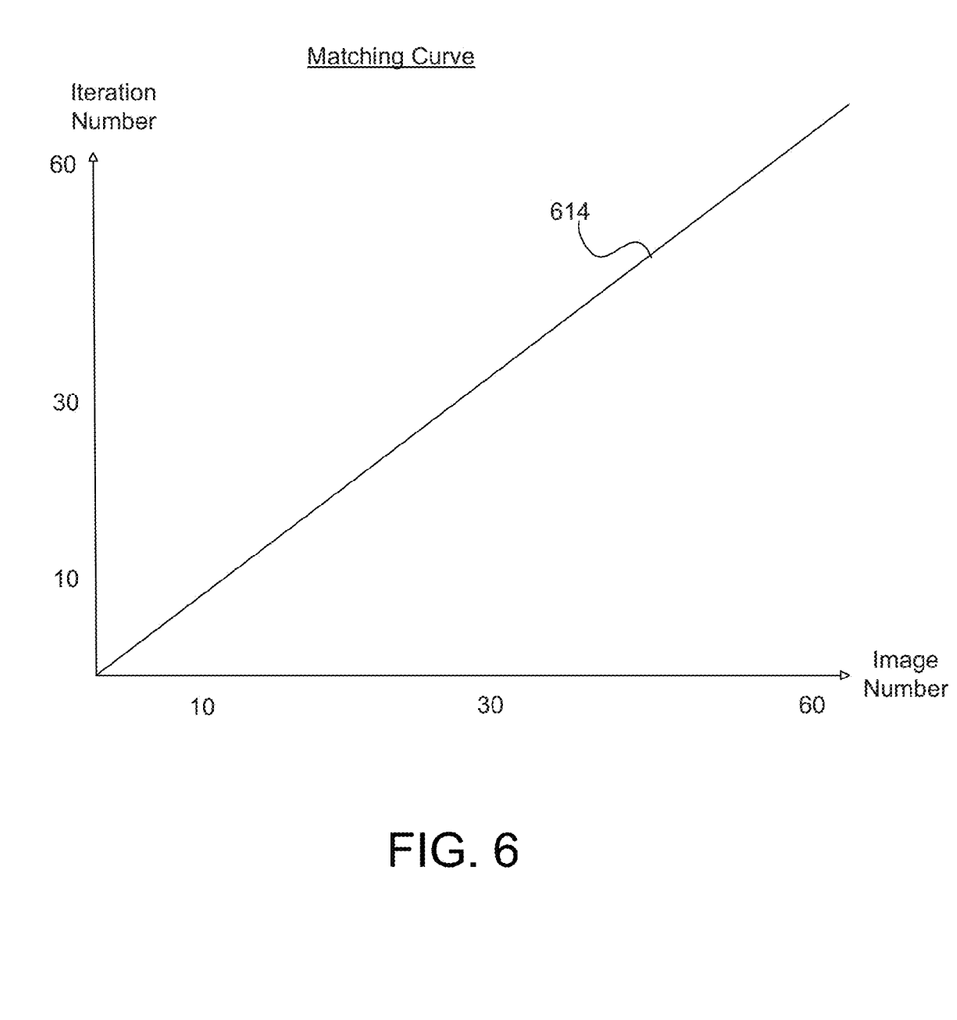
FIG. 6 is a graph of an exemplary matching curve, in accordance with one embodiment of the present invention.

Referring now to FIG. 6, a graph of an exemplary matching curve 714 is shown, in accordance with one embodiment of the present invention. The FIG. 6 embodiment is presented for purposes of illustration, and in alternate embodiments, the present invention may be implemented to utilize matching curves with configurations and parameters in addition to, or instead of, certain of those configurations and parameters discussed in conjunction with the FIG. 6 embodiment.

In certain embodiments, a blur image1 and a more-defocused blur image2 may be captured, the sharper image1 may be convolved with a Gaussian kernel (for example, a 3×3 Gaussian matrix with small variance) to produce a convolved image1. The convolved image1 is compared to blur image2. This process is repeated until the two blur image match. The number of iterations may then be graphed against depth-of-field (or image numbers in increments of one DOF) to produce a blur matching curve that can be used to estimate the distance from any out-of-focus position to the in-focus position. Additional details regarding the foregoing depth estimation technique are further discussed in U.S. Pat. No. 8,045,046 to Li et al., which is hereby incorporated by reference.

Figure 7:
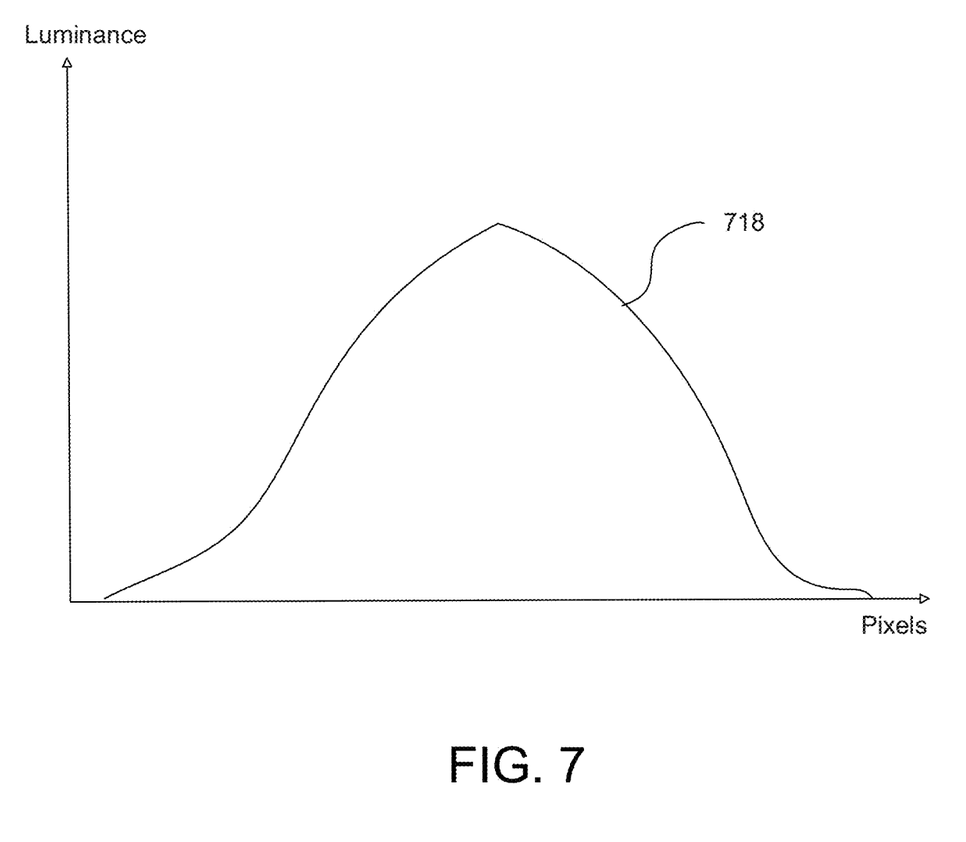
FIG. 7 is a graph of an exemplary Gaussian model of a blur image, in accordance with one embodiment of the present invention.

Referring now to FIG. 7, a graph of an exemplary Gaussian model 718 of a blur image 518 (FIG. 5) is shown, in accordance with one embodiment of the present invention. The FIG. 7 embodiment is presented for purposes of illustration, and in alternate embodiments, the present invention may utilize Gaussian models with elements and configurations other than those discussed in conjunction with the FIG. 7 embodiment.

In the FIG. 7 embodiment, luminance is represented on a vertical axis and pixels are represented on a horizontal axis. In the FIG. 7 graph, Gaussian model 718 displays a typical bell-curve shape. However, not all blur images 518 are best represented by utilizing a Gaussian model 718. Depending upon image characteristics of a photographic target or scene, certain non-Gaussian models may be more effective.

Figure 8:
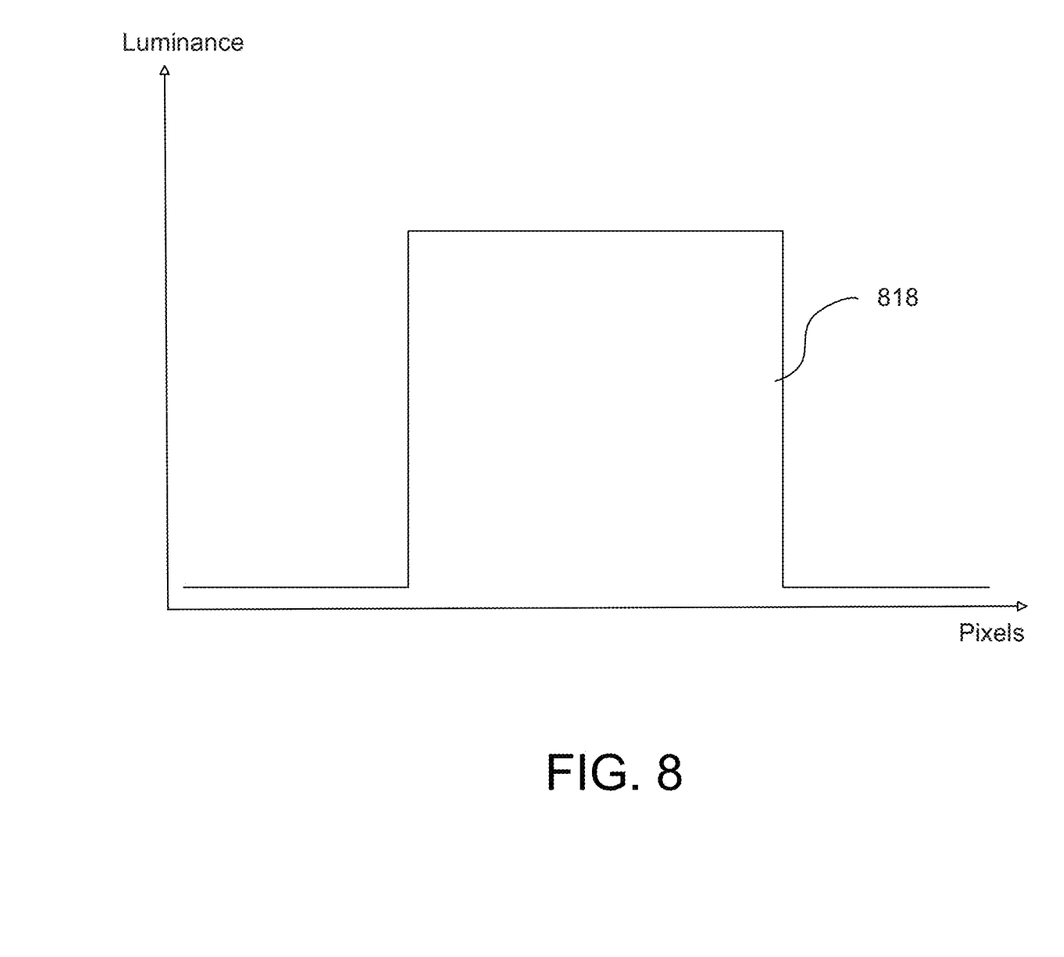
FIG. 8 is a graph of an exemplary pillbox model of a blur image, in accordance with one embodiment of the present invention.

Referring now to FIG. 8, a graph of an exemplary pillbox model of a blur image 518 shown, in accordance with one embodiment of the present invention. The FIG. 8 embodiment is presented for purposes of illustration, and in alternate embodiments, the present invention may utilize pillbox models with elements and configurations other than those discussed in conjunction with the FIG. 8 embodiment.

In the FIG. 8 embodiment, luminance is represented on a vertical axis and pixels are represented on a horizontal axis. In the FIG. 8 graph, pillbox model 818 displays a typical sharp-edged shape. Depending upon image characteristics of a photographic target or scene, certain non-Gaussian models, such as pillbox model 818, may be more effective. For example, a pillbox model 818 may be better for a dark night scene that includes a very bright light source such as a candle.

Figure 9:
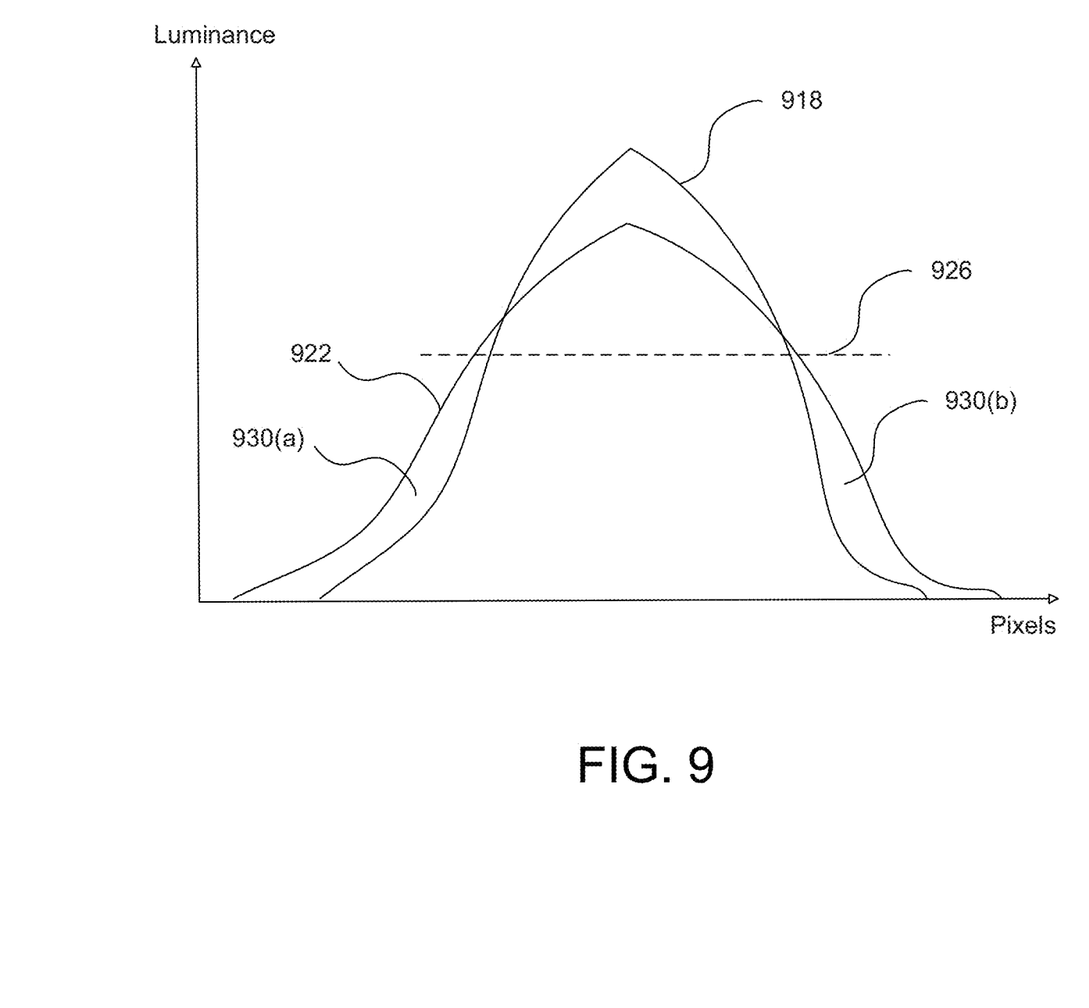
FIG. 9 is a graph of two saturated Gaussian blur images, in accordance with one embodiment of the present invention.

Referring now to FIG. 9, a diagram of two saturated Gaussian images 918 and 922 is shown, in accordance with one embodiment of the present invention. The FIG. 9 embodiment is presented for purposes of illustration, and in alternate embodiments, the present invention may utilize Gaussian images with elements and configurations other than those discussed in conjunction with the FIG. 9 embodiment.

In the FIG. 9 embodiment, waveforms for a first Gaussian blur image 918 and a second Gaussian blur image 922 are shown superimposed. Since image 918 is more focused, its waveform shape is narrower and taller than the waveform of image 922. In the FIG. 9 embodiment, the Gaussian images are clipped/saturated because they both exceed a saturation threshold level 926.

In the FIG. 9 embodiment, the graph also includes an edge region 930 that is comprised of a first edge region 930(a) and a second edge region 930(b). First edge region 930(a) is the area on the left side of the FIG. 9 graph that is less than the saturation threshold 926 and between the left sides of waveform 922 and waveform 918. Second edge region 930(b) is the area on the right side of the FIG. 9 graph that is less than the saturation threshold 926 and between right sides of waveform 922 and waveform 918. Certain techniques for detecting Gaussian scenes containing Gaussian blur images are further discussed below in conjunction with FIGS. 10-11.

Figure 10:
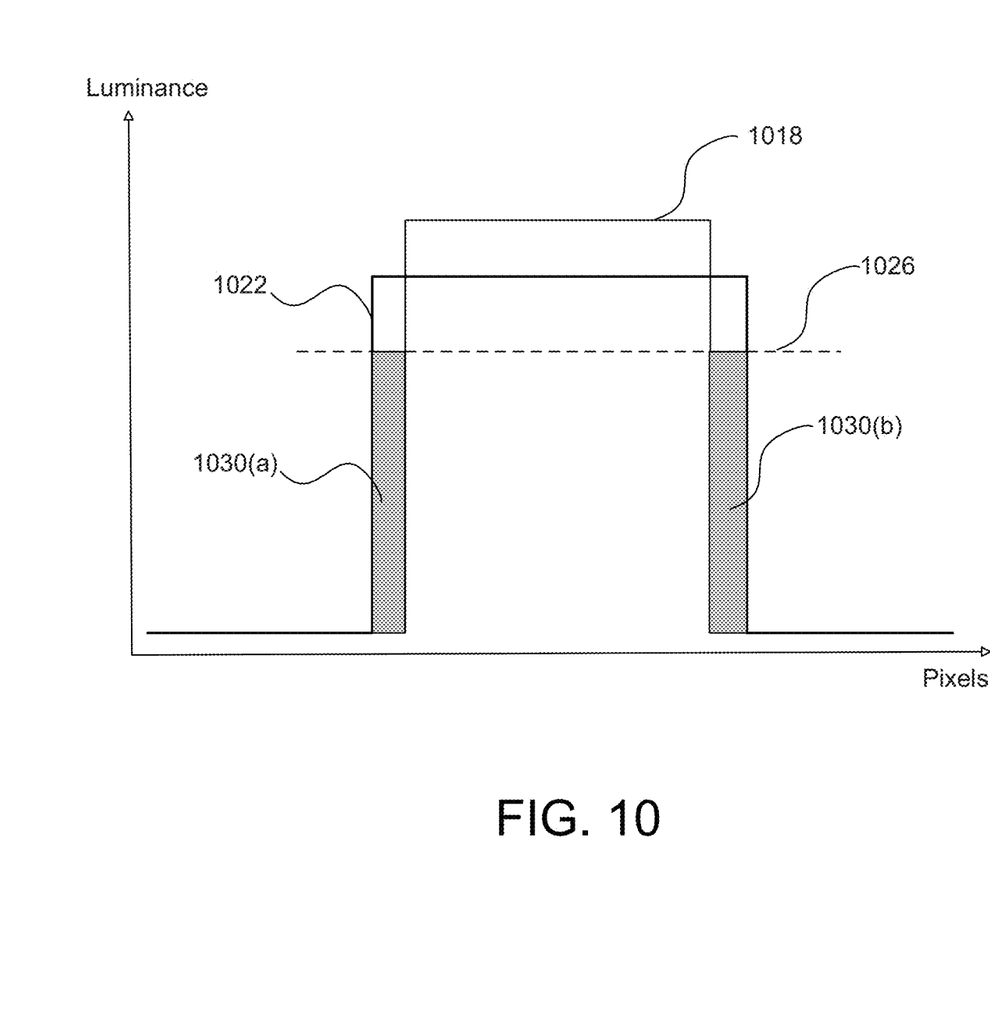
FIG. 10 is a graph of two saturated pillbox blur images, in accordance with one embodiment of the present invention.

Referring now to FIG. 10, a diagram of two saturated pillbox images 1018 and 1022 is shown, in accordance with one embodiment of the present invention. The FIG. 10 embodiment is presented for purposes of illustration, and in alternate embodiments, the present invention may utilize pillbox images with elements and configurations other than those discussed in conjunction with the FIG. 10 embodiment.

In the FIG. 10 embodiment, waveforms for a first pillbox blur image 1018 and a second pillbox blur image 1022 are shown superimposed. Since image 1018 is more focused, its waveform shape is narrower and taller than the waveform of image 1022. In the FIG. 10 embodiment, the pillbox images are clipped/saturated because they both exceed a saturation threshold level 1026.

In the FIG. 10 embodiment, the graph also includes an edge region 1030 that is comprised of a first edge region 1030(a) and a second edge region 1030(b). First edge region 1030(a) is the shaded area on the left side of the FIG. 10 graph that is less than the saturation threshold 1026 and between the left sides of waveform 1022 and waveform 1018. Second edge region 1030(b) is the shaded area on the right side of the FIG. 10 graph that is less than the saturation threshold 1026 and is between right sides of waveform 1022 and waveform 1018. FIG. 10 is a one dimensional illustration of a pillbox blur. For two dimensional images, the edge region is a ring-shaped area between the boundaries of the two pillboxes.

In accordance with the present invention, depth estimator 416 (FIG. 4) may need to determine whether a particular scene is a Gaussian scene or a pillbox scene for purposes of selecting an appropriate depth estimation procedure. For example, in conjunction with FIG. 6 above, a basic depth estimation procedure is discussed, as disclosed in U.S. Pat. No. 8,045,046 to Li et al.

In addition, a Gaussianization depth estimation procedure as well as a fillbox procedure are disclosed in U.S. patent application Ser. No. 13/426,828 by Li et al. entitled "System And Method For Performing Depth Estimation Utilizing Pillbox Defocused Images," filed on Mar. 22, 2012, which is hereby incorporated by reference. The Gaussianization depth estimation procedure can handle Gaussian blurs and non-Gaussian blurs when the captured images are not clipped.

When the captured images are clipped (overexposed or underexposed), depth estimator 416 must determine whether treat them as Gaussian blurs or pillbox blurs. In the case of clipped pillbox blurs, depth estimator 416 may utilize the fillbox procedure and Gaussianization procedure referred to above. In the case of Gaussian blurs, depth estimator 416 may utilize a clipped-pixel substitution procedure that is disclosed in U.S. patent application Ser. No. 13/416,049 by Li et al. entitled "System And Method For Performing Depth Estimation With Defocused Images Under Extreme Lighting Conditions," filed on Mar. 9, 2012, which is hereby incorporated by reference.

With regard to the embodiments of FIGS. 9-10, a saturated pillbox image (FIG. 10) generally has sharper edges when compared to a saturated Gaussian blur (FIG. 9). Because of the geometry of the edge region, the average luminance difference in the edge region 1030 can be shown to be greater for pillbox blurs as compared to Gaussian blurs (see FIG. 9). In accordance with the present invention, depth estimator 416 may utilize this property to detect either a Gaussian scene or a pillbox scene. The foregoing fillbox procedure and Gaussianization procedure may be utilized when a pillbox scene is detected. Conversely, the clipped-pixel substitution procedure may be utilized when a Gaussian scene is detected.

For some camera settings such as narrow depth separation between two pictures, even when a pillbox blur is not saturated, it may cause noisy matching results. In this case, depth estimator 416 may apply a trimbox technique to reduce the noise. An example of a trimbox technique is discussed below in conjunction with FIG. 12. This situation requires scene detection even when the image is not clipped.

To handle this situation, depth estimator 416 may perform a blur difference estimation with two different algorithms. One algorithm treats the scene as a Gaussian scene and performs normal Gaussian matching. The other algorithm treats the scene as a pillbox scene and performs the trimbox method. From the two results, depth estimator 416 may choose the result with bigger absolute iteration number as the final result for the blur difference. This dual scene detection method may also be used effectively for saturated scenes. Additional details for performing one embodiment of a scene detection procedure are further discussed below in conjunction with FIG. 11.

Figure 11A:
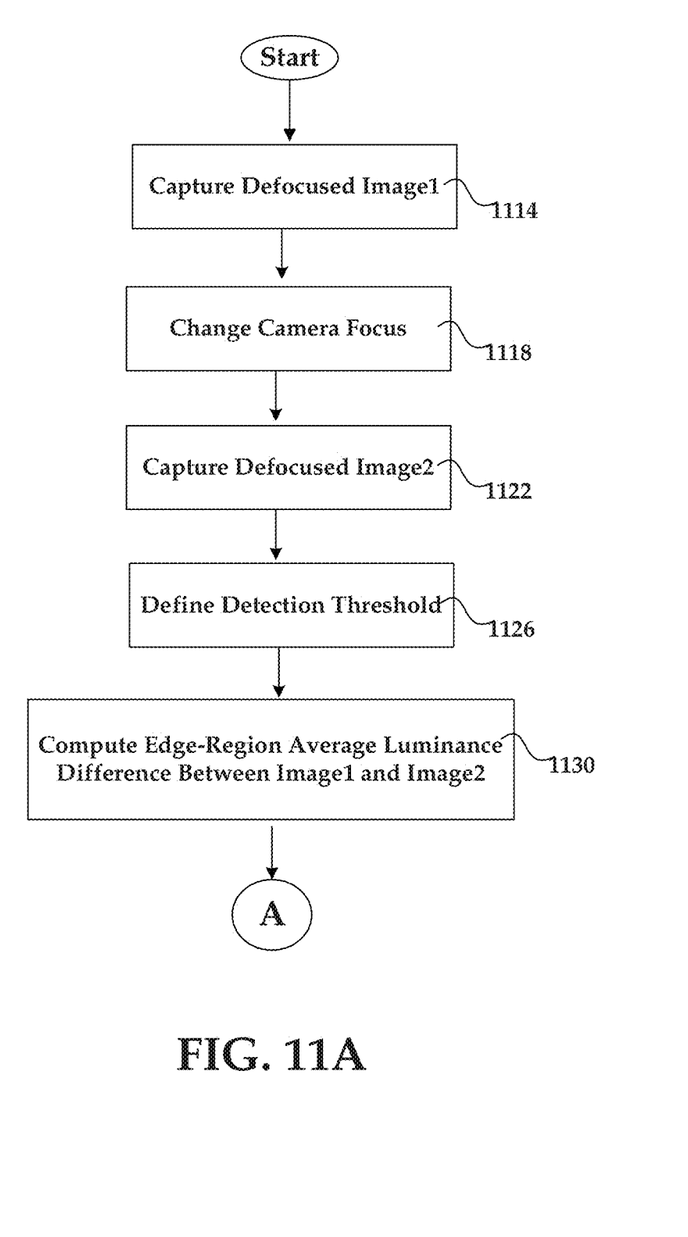
FIGS. 11A-11B are a flowchart of method steps for performing a scene detection procedure, in accordance with one embodiment of the present invention.
Figure 11B:
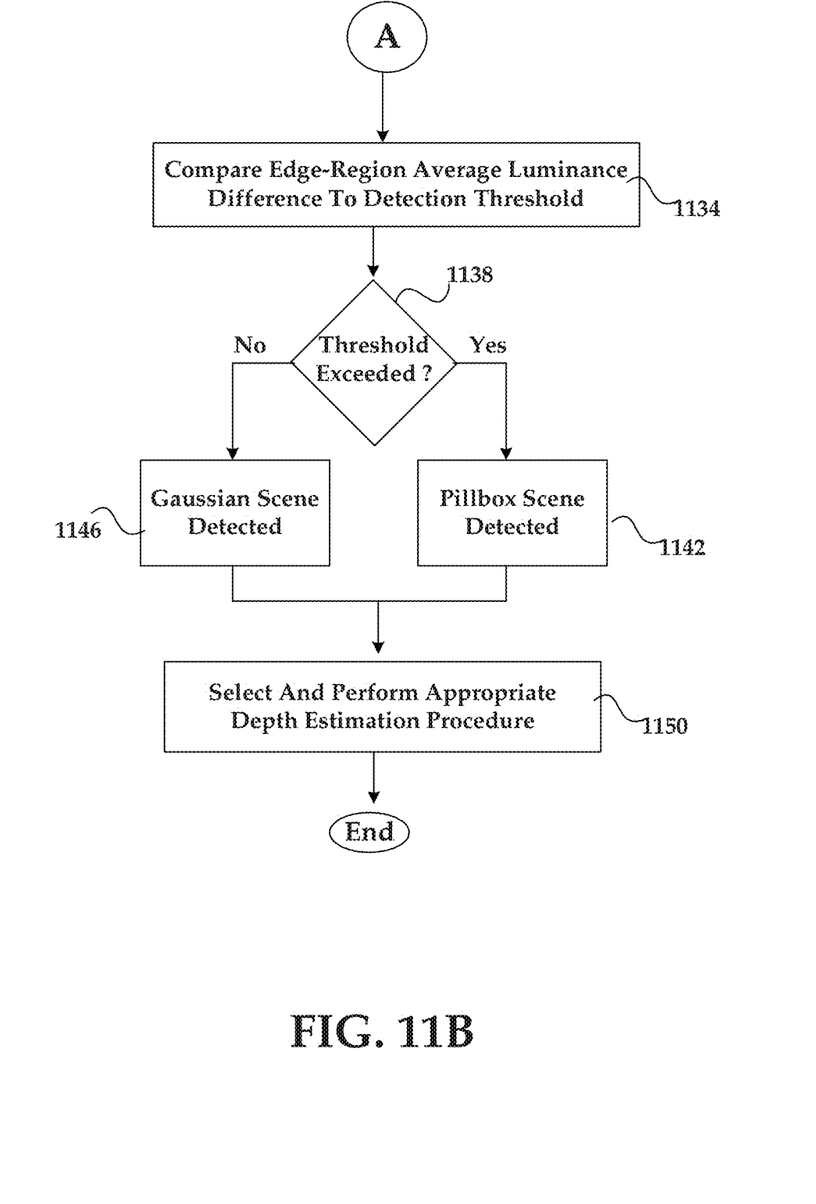

Referring now to FIGS. 11A-11B, a flowchart of method steps for performing a scene detection procedure is shown, in accordance with one embodiment of the present invention. The FIG. 11 embodiment is presented for purposes of illustration, and in alternate embodiments, the present invention may readily utilize various steps and sequences other than those steps and sequences discussed in conjunction with the FIG. 11 embodiment.

In the FIG. 11A embodiment, in step 1114, camera 110 captures a defocused image1. In step 1118, the focus setting of camera 110 is changed. For example, in the FIG. 11A embodiment, the focus setting may be adjusted to decrease the focus of camera 110 by one depth-of-field. In step 1122, camera 110 captures a defocused image2 that is more blurry (out of focus) than previously captured image1.

In step 1126, a depth estimator 416 or other appropriate entity defines a detection threshold for choosing between a Gaussian scene and a pillbox scene. In step 1130, depth estimator 416 computes an edge-region average luminance difference between image1 and image2, as discussed above in conjunction with FIG. 10. The FIG. 11A process then advances to step 1134 of FIG. 11B through connecting letter "A."

In steps 1134 and 1138, depth estimator 416 compares the calculated edge-region average luminance difference to the defined detection threshold. If the detection threshold is exceeded, then in step 1142, depth estimator 416 identifies the captured image1 and image2 as part of a pillbox scene. Conversely, if the detection threshold is not exceeded, then in step 1146, depth estimator 416 identifies the captured image1 and image2 as part of a Gaussian scene. Finally, in step 1150, depth estimator 416 may select and perform an appropriate depth estimation procedure depending upon whether a Gaussian scene or a pillbox scene was detected. The FIG. 11 process may then terminate. The present invention therefore provides an improved system and method for utilizing scene detection for performing a depth estimation procedure.

Figure 12A:
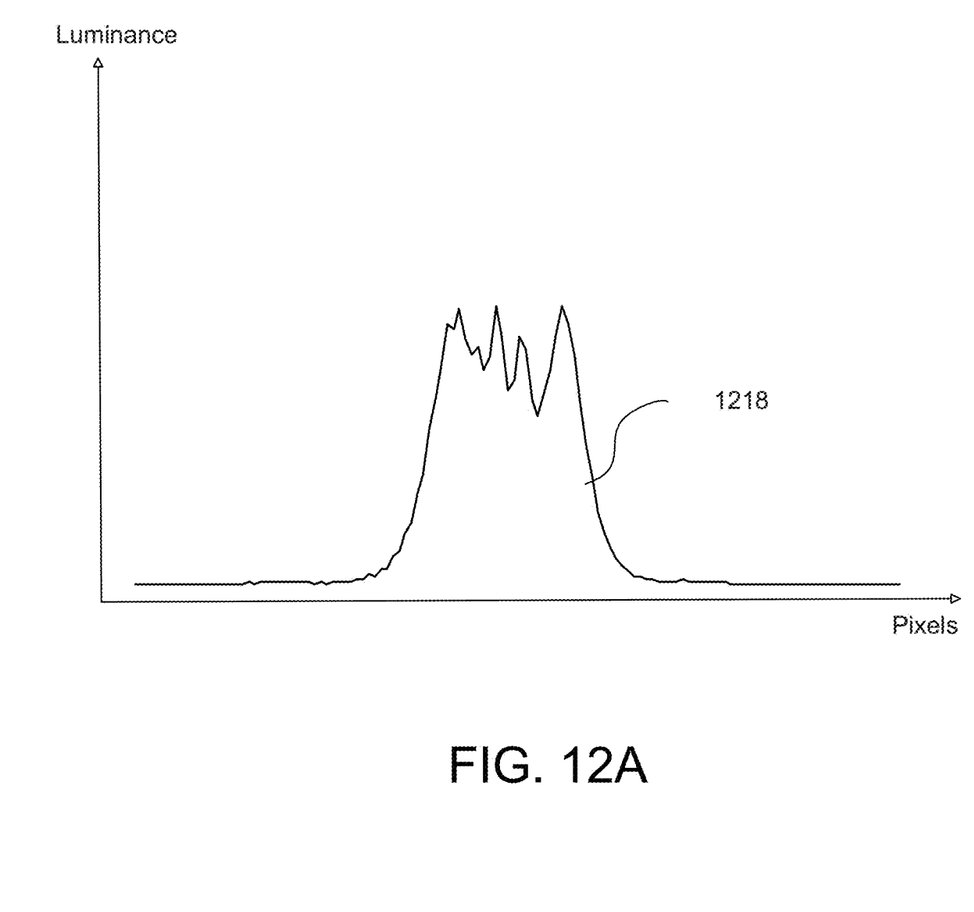
FIGS. 12A-12B are diagrams illustrating a trimbox procedure, in accordance with one embodiment of the present invention.
Figure 12B:
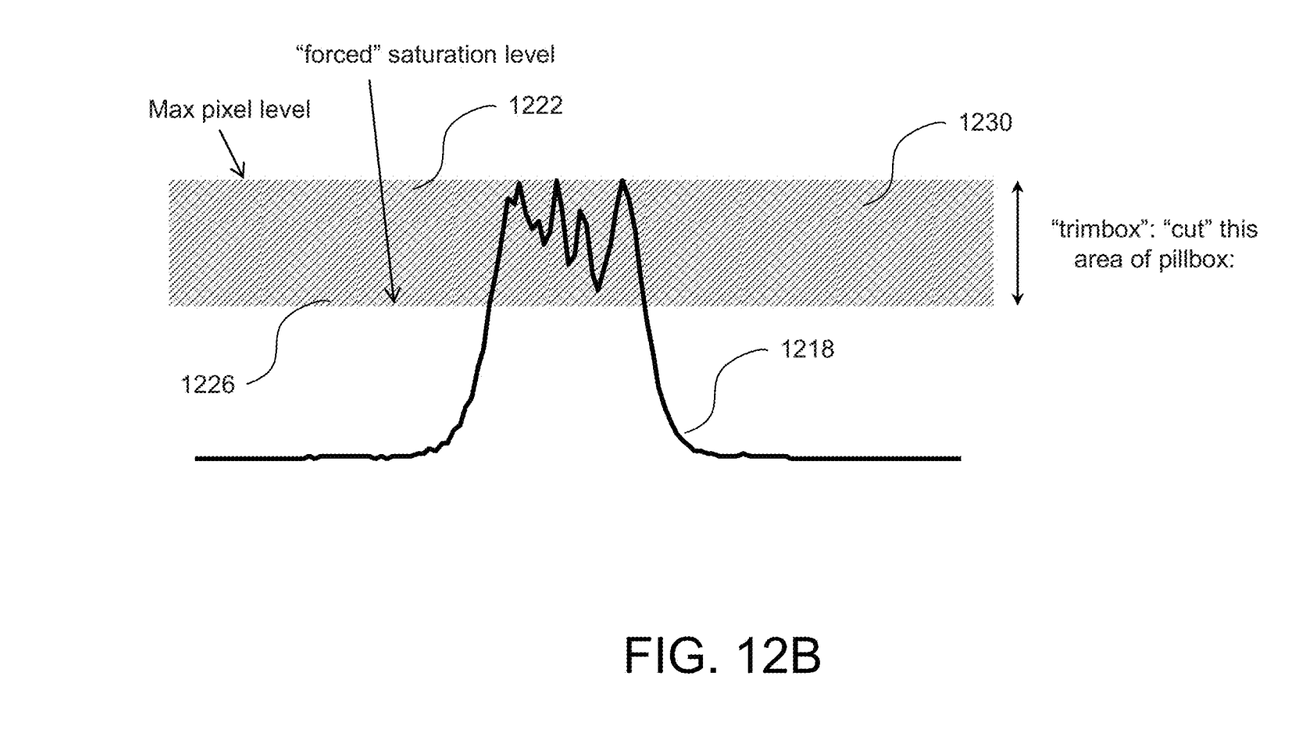

Referring now to FIGS. 12A-12B, diagrams illustrating a trimbox procedure are shown, in accordance with one embodiment of the present invention. The FIG. 12 embodiment is presented for purposes of illustration, and in alternate embodiments, the present invention may perform trimbox procedures with elements, steps, and configurations other than those discussed in conjunction with the FIG. 12 embodiment.

In the FIG. 12A embodiment, a graph of a noisy pillbox blur image 1218 is shown. The FIG. 12A graph presents luminance on a vertical axis and pixels on a horizontal axis. In general, pillbox blur images may be noisy due to inconsistent lighting or a various other reasons. The trimbox procedure provides a way of creating "forced saturation" to trim off the noise when a noisy pillbox image occurs. One such trimbox embodiment is discussed below in conjunction with FIG. 12B.

In FIG. 12B embodiment, the noisy pillbox image1218 is shown with a maximum/brightest pixel level 1222 and a forced saturation level 1226. In effect, depth estimator 416 performs the trimbox procedure to "cut" the shaded trim area 1230 from noisy image1218 to produce a trimmed image with a flat top with an amplitude at the forced saturation level 1226.

In one embodiment, a trimbox manager of depth estimator 416 initially determines a maximum/brightest pixel level 1222. Then, the trimbox manager selects a trim percentage. The trimbox manager may next determine a forced saturation level 1226 by subtracting the selected trim percentage from the maximum pixel level 1222. Depth estimator 416 may finally select and perform an appropriate depth estimation procedure. For example, in certain embodiments, depth estimator 416 may advantageously apply the previously discussed fillbox procedure and Gaussianization procedure to generate required depth information.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing a depth estimation procedure, comprising:
    a sensor device for capturing blur images of a photographic target, said blur images each corresponding to a scene type that is detected from a first scene type and a second scene type; and a depth generator that performs a scene recognition procedure to identify said scene type for said blur images, said depth generator identifying said scene type by analyzing energy levels of said blur images, said depth generator then selecting said depth estimation procedure depending upon said scene type.

2. A system for performing a depth estimation procedure, comprising:
   a sensor device for capturing blur images of a photographic target, said blur images each corresponding to a scene type that is detected from a first scene type and a second scene type; and
   a depth generator that performs a scene recognition procedure to identify said scene type for said blur images, said depth generator then selecting said depth estimation procedure depending upon said scene type, said first scene type being a Gaussian scene type and said second scene type being a pillbox scene type.

3. The system of claim 2 wherein said depth generator performs said scene recognition procedure by analyzing said energy levels of a pair of said blur images.

4. The system of claim 2 wherein said pair of said blur images are clipped because of exceeding a saturation threshold level of said sensor device.

5. The system of claim 4 wherein said depth generator performs said scene recognition procedure by calculating an edge-region average luminance difference for an edge region that is less than said saturation threshold level in said pair of said blur images.

6. The system of claim 5 wherein said edge region includes a first edge region and a second edge region from a superimposed version of said pair of said blur images.

7. The system of claim 5 wherein said edge-region average luminance difference is greater than a pre-defined detection threshold for said pillbox scene type, said edge-region average luminance difference being less than said pre-defined detection threshold for said Gaussian scene type.

8. The system of claim 4 wherein said sensor device and said depth generator are implemented in an electronic camera device that utilizes one or more depth values from said depth estimation procedure to perform an automatic focusing procedure.

9. The system of claim 8 wherein said sensor device captures an image1 corresponding to said photographic target by utilizing a first defocused lens position, said camera device then being adjusted to a second defocused lens position that is different than said first defocused lens position, said sensor device capturing an image2 corresponding to said photographic target by utilizing said second defocused lens position.

10. The system of claim 9 wherein said depth estimator defines a detection threshold for performing said scene detection procedure.

11. The system of claim 10 wherein said depth estimator computes an edge-region average luminance difference between said image1 and said image2.

12. The system of claim 11 wherein said depth estimator compares said edge-region average luminance difference to said detection threshold.

13. The system of claim 12 wherein said depth estimator detects said pillbox scene type when said edge-region average luminance difference is greater than said detection threshold, said depth estimator detecting said Gaussian scene type when said edge-region average luminance difference is less than said detection threshold.

14. The system of claim 13 wherein said depth generator selects and performs a fillbox procedure and a Gaussianization depth estimation procedure when said pillbox scene type is detected.

15. The system of claim 13 wherein said depth generator selects and performs a clipped-pixel substitution procedure when said Gaussian scene type is detected.

16. A method for performing a depth estimation procedure by performing the steps of:
   utilizing a sensor device for capturing blur images of a photographic target, said blur images each corresponding to a scene type that is detected from a first scene type and a second scene type; and
   providing a depth generator that performs a scene recognition procedure to identify said scene type for said blur images, said depth generator identifying said scene type by analyzing energy levels of said blur images, said depth generator then selecting said depth estimation procedure depending upon said scene type.

17. The method of claim 16 wherein said depth generator performs a blur difference estimation with two different algorithms, a first algorithm treating a scene as a Gaussian scene and performing normal Gaussian matching, a second algorithm treating said scene as a pillbox scene and performing a trimbox method, said depth estimator choosing a result with a larger absolute iteration number as a final blur difference result.

* * * * *